(12) United States Patent
Glose

(10) Patent No.: US 11,095,242 B2
(45) Date of Patent: Aug. 17, 2021

(54) CONTROL DEVICE FOR CONTROLLING THE CURRENT OF A ROTATING FIELD MACHINE OF A MOTOR VEHICLE, CURRENT CONTROL METHOD, DRIVE UNIT AND MOTOR VEHICLE

(71) Applicant: Bayerische Motoren Werke Aktiengesellschaft, Munich (DE)

(72) Inventor: Daniel Glose, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/957,420

(22) PCT Filed: Mar. 12, 2019

(86) PCT No.: PCT/EP2019/056186
§ 371 (c)(1),
(2) Date: Jun. 24, 2020

(87) PCT Pub. No.: WO2019/197107
PCT Pub. Date: Oct. 17, 2019

(65) Prior Publication Data
US 2020/0350844 A1 Nov. 5, 2020

(30) Foreign Application Priority Data
Apr. 12, 2018 (DE) ...................... 10 2018 205 514.9

(51) Int. Cl.
*H02P 21/22* (2016.01)
*H02M 1/12* (2006.01)

(52) U.S. Cl.
CPC .............. *H02P 21/22* (2016.02); *H02M 1/12* (2013.01)

(58) Field of Classification Search
CPC .......... H02P 21/22; H02P 29/50; H02M 1/12; H02M 1/14
See application file for complete search history.

(56) References Cited

U.S. PATENT DOCUMENTS

2012/0161685 A1 6/2012 Geyer et al.
2013/0307449 A1* 11/2013 Kobayashi ............ B60W 20/00
318/400.02

(Continued)

FOREIGN PATENT DOCUMENTS

DE 44 26 764 A1 2/1996
DE 44 31 397 C1 2/1996

(Continued)

OTHER PUBLICATIONS

International Search Report (PCT/ISA/210) issued in PCT Application No. PCT/EP2019/056186 dated Jun. 5, 2019 with English translation (six pages).

(Continued)

*Primary Examiner* — Thai T Dinh
(74) *Attorney, Agent, or Firm* — Crowell & Moring LLP

(57) ABSTRACT

A control device for controlling the current of a rotating field machine of a motor vehicle, includes a current controller for determining a fundamental of an output voltage for a respective operating point, a controller for modulating the output voltage by driving a rectifier of the control device based on a pulse pattern optimized offline for the respective operating point, and a current sensor for sampling a harmonics-impacted output current, resulting from the pulse pattern that is used, of the rectifier and for returning the sampled output current to the current controller. Sampling times for sampling the output current are optimized offline in a manner specific to the pulse pattern and are predetermined as those times at which a deviation between the harmonics-impacted (Continued)

output current and a fundamental of the output current is less than a predetermined threshold value.

9 Claims, 2 Drawing Sheets

(56) References Cited

U.S. PATENT DOCUMENTS

| 2016/0344314 | A1* | 11/2016 | Akimatsu | ............... | H02P 29/50 |
| 2017/0222583 | A1* | 8/2017 | Akimatsu | ................ | H02P 6/16 |
| 2019/0312539 | A1* | 10/2019 | Seguchi | .................... | H02P 6/32 |
| 2020/0162002 | A1* | 5/2020 | Taniguchi | .............. | H02K 21/16 |

FOREIGN PATENT DOCUMENTS

| DE | 196 26 447 A1 | 3/1998 |
| DE | 10 2011 075 789 A1 | 11/2012 |

OTHER PUBLICATIONS

German-language Written Opinion (PCT/ISA/237) issued in PCT Application No. PCT/EP2019/056186 dated Jun. 5, 2019 (seven pages).

German-language Office Action issued in German Application No. 10 2018 205 514.9 dated May 3, (six pages).

Briz et al., "Current Sampling and Measurement in PWM Operated AC Drives and Power Converters", The 2010 International Power Electronics Conference, Jun. 21, 2010, pp. 2753-2760, XP031728363, eight pages.

Horstmann et al., "Die stromrichternahe Antriebsregelung des Steuergerätes für Bahnautomatisierungssysteme SIBAS 32", Elektrische Bahnen, 1992, pp. 344-350, vol. 90, No. 11, seven pages.

Enni et al., "Steuerverfahren für selbstgeführte Stromrichter", 1995, pp. 97 and 153-167, B.G. Teubner Stuttgart, 17 pages.

Quang et al., "Vector Control of Three-Phase AC Machines", 2008, pp. 108-110, Springer Berlin Heidelberg, three pages.

* cited by examiner

CONTROL DEVICE FOR CONTROLLING THE CURRENT OF A ROTATING FIELD MACHINE OF A MOTOR VEHICLE, CURRENT CONTROL METHOD, DRIVE UNIT AND MOTOR VEHICLE

BACKGROUND AND SUMMARY OF THE INVENTION

The invention relates to a control device for controlling the current of a rotating field machine of a motor vehicle. The control device has a current controller that is designed to determine a fundamental component of an output voltage for a respective operating point. The control device furthermore has a controller that is designed to modulate the output voltage by driving a rectifier of the control device based on a predetermined pulse pattern that is optimized offline with regard to a minimum current harmonic content for the respective operating point. The control device furthermore comprises a current sensor that is designed to sample a harmonics-impacted output current, resulting from the pulse pattern that is used, of the rectifier and to feed said output current back to the current controller. The invention furthermore relates to a current control method, to a drive unit and to a motor vehicle.

What are of interest in the present case are rotating field machines or three-phase current machines having a variable rotational speed and that may be used for example as drive machines for electrically drivable motor vehicles. Such a rotating field machine may for example be a three-phase rotating field machine whose three phases are energized with a particular setpoint current by way of a rectifier in order to provide a particular rotational speed. For this purpose, the rectifier has a number of rectifier half-bridges with controllable switches that corresponds to the number of phases. In order to operate the rotating field machine with a variable rotational speed, the switches may for example be driven on the basis of space vector modulation. The space vector modulation generates output voltages of the rectifier half-bridges with a fundamental component that is predefined by a current controller for a respective operating point. Space vector modulation is however unsuitable for some operating points, since it results in harmonics-impacted output currents or current distortions. Such operating points are characterized by a high degree of modulation and a low switching frequency of the switches of the rectifier.

To this end, is known from DE 196 26 447 A1 to modulate the output voltages on the basis of optimized pulse patterns. These optimized pulse patterns are predetermined depending on the operating point to be provided and result in output currents of the rectifier having a lower current harmonic content. If this output current is then sampled at times at which current harmonics or current ripple occur, and if this unfavorably sampled output current is fed back to the current controller, then said current controller attempts to compensate the deviations between the setpoint current and the sampled output current by adjusting the output voltage. This is however not expedient, since the deviations caused by the current harmonics are not able to be influenced by the current controller. DE 196 26 447 A1 therefore additionally proposes to first of all sample the output current in synchronicity with the pulse pattern. In order to correct the output current, the components of the current ripple that depend on the optimized pulse pattern are subtracted from the sampled output current, and the output current corrected in this way is fed to the current controller. For this purpose, it is necessary to estimate and parameterize the components of the current ripple, which lead to inaccurate results.

The object of the present invention is to provide an alternative solution for providing reliable current control for a rotating field machine of a motor vehicle.

This object is achieved according to the invention by a control device, a method, a drive unit and a motor vehicle having the features according to the respective independent patent claims. Advantageous refinements of the invention are the subject matter of the dependent patent claims, the description and the figures.

A control device according to the invention serves to control the current of a rotating field machine of a motor vehicle. The control device comprises a current controller that is designed to determine a fundamental component of an output voltage for a respective operating point. The control device furthermore comprises a controller that is designed to modulate the output voltage by driving a rectifier of the control device based on a predetermined pulse pattern that is optimized offline with regard to a minimum current harmonic content for the respective operating point. A current sensor of the control device is designed to sample a harmonics-impacted output current, resulting from the pulse pattern that is used, of the rectifier and to feed said output current back to the current controller. Sampling times for sampling the output current are furthermore optimized offline with regard to the pulse pattern that is used and are predetermined as those times at which a deviation between the harmonics-impacted output current and a fundamental of the output current is less than a predetermined threshold value.

The invention furthermore relates to a method for controlling the current of a rotating field machine of a motor vehicle. In the method, a fundamental component of an output voltage is determined for a respective operating point by a current controller. The output voltage is modulated based on a predetermined pulse pattern by way of a rectifier, which pulse pattern is optimized offline with regard to a minimum current harmonic content for the respective operating point. Furthermore, a harmonics-impacted output current, resulting from the pulse pattern that is used, of the rectifier is sampled by a current sensor and fed back to the current controller. Furthermore, sampling times for sampling the output current are optimized offline with regard to the pulse pattern that is used and provided for current control during operation of the rotating field machine. The sampling times are predetermined as those times at which a deviation between the harmonics-impacted output current and a fundamental of the output current is less than a predetermined threshold value.

The rotating field machine and the control device with the rectifier form a control circuit. The rotating field machine is in particular a multiphase rotating field machine with a variable rotational speed and that is designed as a drive machine for an electrically drivable motor vehicle. The rectifier is provided in order to energize phases of the electrical machine and has a number of rectifier half-bridges with controllable switches that corresponds to the number of phases. Such switches are in particular semiconductor switches in the form of power MOSFETs or IGBTs. The rotating field machine and the rectifier of the control device form the control section of the control circuit.

In order to provide a particular operating point at which the rotating field machine has a particular rotational speed, the individual phases are energized with particular setpoint currents that are provided as output currents of the rectifier. In order to provide these setpoint currents, setpoint values for the fundamental components of the output voltages are determined and predefined by the current controller. These setpoint values are in particular setpoint values for the fundamental amplitude and the fundamental frequency of the output voltages. These output voltages are modulated by the rectifier and are provided at the output of the rectifier half-bridges.

In order to modulate or generate the output voltages, what is known as pulse pattern modulation is performed. For this purpose, operating point-specific pulse patterns are determined offline, that is to say for example during test operation of the rotating field machine at the manufacturer. The pulse pattern is in this case characterized or described by switching angles for the switches of the rectifier, and is defined such that an output current resulting from the pulse pattern has reduced harmonics or distortions. An operating point may for example be described by a particular degree of modulation of the rotating field machine and a pulse ratio. The degree of modulation is the ratio between the fundamental amplitude, to be provided in order to set the rotational speed, of the output voltage of the rectifier and the maximum possible physical fundamental amplitude of the output voltage of the rectifier. The pulse ratio is the ratio between the switching frequency of the switches of the rectifier and the fundamental frequency, to be provided in order to set the rotational speed, of the output voltage of the rectifier. The pulse ratio for example defines the number of possible switching angles within a quarter-oscillation of the pulse pattern.

In order then to create a particular operating point, the pulse pattern optimized offline and corresponding to this operating point is thus provided by driving the switches of the rectifier according to the switching angles, optimized offline, of this pulse pattern. The pulsed output voltages, provided at the output of the rectifier, of the rectifier half-bridges, due to the phase windings of the rotating field machine, result in virtually sinusoidal output currents that may still however be impacted by harmonics. These harmonics-impacted output currents are then sampled in order to be able to feed the sampled output current back to the current controller. The sampling is performed in this case at the output of the rectifier by way of a current sensor. If sampling were then to be performed at times at which harmonics occur, then the current controller would detect a harmonics-induced deviation between the output current and the setpoint current. Although the current controller is not able to influence the harmonics, it would adjust the fundamental of the output voltage in order to control the current.

Therefore, in addition to the pulse pattern that is optimized offline, pulse pattern-specific sampling times are also predetermined and provided as sampling times that are optimized offline for the sampling. For this purpose, those times at which the deviation between the harmonics-impacted output current and the fundamental of the output current is at a minimum are determined. Such times are in particular determined at intersections between the harmonics-impacted output current and the fundamental of the output current. Specifically, the current distortions are at a minimum at these times. The threshold value is thus approximately zero. During operation of the rotating field machine, the pulse pattern that is optimized offline and required for the operating point to be provided is thus first of all provided and the rectifier is operated based on the pulse pattern. The sampling times corresponding to the pulse pattern that is used and with minimum harmonics are then provided. The harmonics-impacted output current is sampled at these sampling times and fed back to the current controller for comparison with the setpoint current.

The control device and the method make it possible to combine optimum pulse patterns and allow the best possible sampling times. By specifying the sampling times with minimum distortion, it is also possible to dispense with complex and imprecise parameterization of current ripple. It is thus easily possible to minimize current distortions and to provide reliable current control.

The predetermined pulse pattern is preferably a pulse pattern that is optimized offline and has quarter-oscillation symmetry. The controller is designed to drive the switches of the rectifier based on the pulse pattern that is optimized offline and has quarter-oscillation symmetry. The pulse pattern may also additionally have half-oscillation symmetry. Such a pulse pattern reduces or eliminates even-order harmonics. In addition to the predefined quarter-oscillation symmetry, the pulse ratio predefines the number of switching angles per quarter oscillation, such that the pulse pattern is defined completely by the switching angle interval [0, $\pi/2$].

It proves to be advantageous if associations of operating points and pulse patterns that are optimized offline are predetermined and stored in a storage apparatus, and the controller is designed to select that pulse pattern that is optimized offline for driving the switches from the associations that corresponds to the respective operating point. It also proves to be advantageous if associations of pulse patterns that are optimized offline and sampling times with minimum harmonics are predetermined and stored in a storage apparatus, and the controller is designed to select those sampling times from the associations and provide them for the current sensor for sampling the harmonics-impacted output current that correspond to the pulse pattern currently being used.

The control device may for example comprise the storage apparatus in which the associations are stored in the form of conversion tables or lookup tables. For this purpose, various operating points in the form of different combinations of degrees of modulation and pulse ratios are assigned respective predetermined pulse patterns that are optimized offline or their switching angles. These pulse patterns that are optimized offline or the switching angles that are optimized offline may in turn be assigned predetermined sampling times that are optimized offline and have minimum distortion. The conversion table stored in the storage apparatus is then read by the controller during operation of the rotating field machine, which controller may then drive the switches of the rectifier and the current sensor. It is thus possible to provide particularly simple and easy current control of the rotating field machine.

There may also be provision that a sampling rate is predefined, and the controller is designed to select a number, corresponding to the sampling rate, of pulse pattern-specific sampling times to be used per fundamental from the associations. The number of sampling times is thus able to be selected freely and may be changed during operation of the rotating field machine.

In one development of the invention, the operating point is determined by a degree of modulation dependent on a fundamental amplitude of the output voltage and by a pulse ratio of a predetermined switching frequency for switches of the rectifier and a fundamental frequency of the output voltage, wherein the controller is designed to provide the pulse pattern modulation if a degree of modulation is greater than a predetermined degree of modulation threshold value and/or a pulse ratio is less than a predetermined pulse ratio threshold value, and otherwise to provide space vector modulation for the rectifier. The controller may thus operate the rectifier on the basis of space vector modulation and on the basis of pulse pattern modulation. The degree of modulation threshold value may for example be 0.91. The pulse ratio threshold value may for example be 20. With low degrees of modulation and with high pulse ratios, space vector modulation is in particular used. This is particularly advantageous because space vector modulation is easy to implement and has linear behavior. With high degrees of modulation and low pulse ratios, pulse pattern modulation is used. At these high degrees of modulation and low pulse ratios, space vector modulation delivers non-linear behavior and high current distortions. In this case, there is a change to pulse pattern modulation, which overcomes these disadvantages.

The invention furthermore relates to a drive unit for a motor vehicle having a rotating field machine and a control device according to the invention or an embodiment of said control device.

A motor vehicle according to the invention comprises a drive unit according to the invention. The motor vehicle is in particular designed as a passenger vehicle in the form of an electric or hybrid vehicle that is able to be driven by the drive unit according to the invention.

The embodiments set forth with regard to the control device according to the invention and the advantages thereof apply accordingly to the method according to the invention, to the drive unit according to the invention and to the motor vehicle according to the invention.

Further features of the invention become apparent from the claims, the figures and the description of the figures. The features and combinations of features mentioned above in the description and the features and combinations of features mentioned below in the description of the figures and/or shown only in the figures are able to be used not only in the respectively specified combination but also in other combinations or on their own.

The invention is now explained in more detail on the basis of a preferred exemplary embodiment and with reference to the drawings.

BRIEF DESCRIPTION OF THE DRAWINGS

In the figures, identical and functionally identical elements are provided with the same reference signs.

DETAILED DESCRIPTION OF THE DRAWINGS

Figure 1:
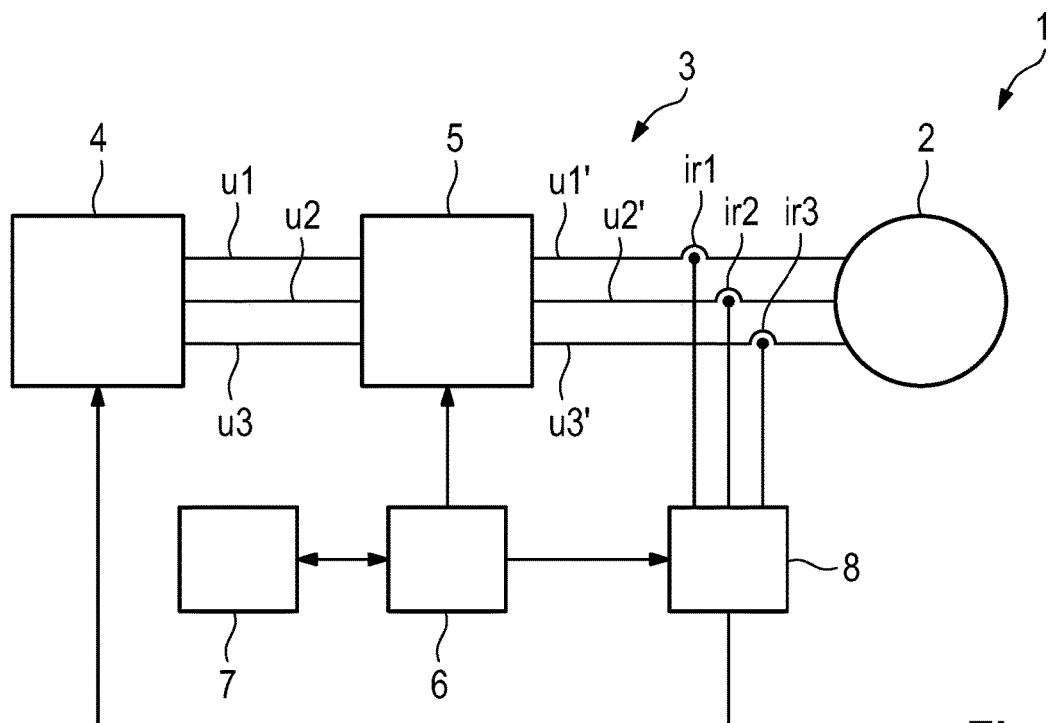
FIG. 1 shows a schematic illustration of one embodiment of a drive unit according to the invention.
Figure 2:
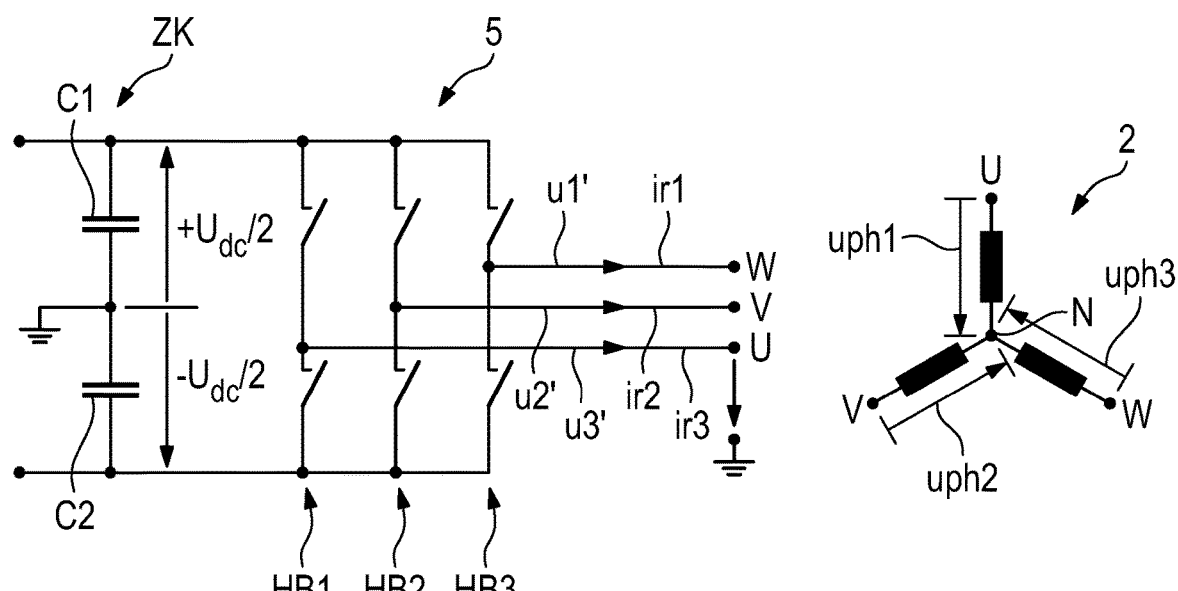
FIG. 2 shows a schematic illustration of a rotating field machine having a rectifier.

FIG. 1 shows one embodiment of a drive unit 1 for an electrically drivable motor vehicle (not shown here). The drive unit 1 has a rotating field machine 2 and a control device 3 for controlling the current of the rotating field machine 2. The rotating field machine 2 is in this case a three-phase rotating field machine that is designed as a drive machine for the motor vehicle. The rotating field machine 2 having the three phases U, V, W, which are connected here at a common neutral point N, is shown in FIG. 2. The control device 3 has a current controller 4 that is able to determine fundamental components u1, u2, u3 for output voltages in order to provide particular operating point-specific setpoint currents for phases of the rotating field machine 2. A particular operating point-specific rotational speed of the rotating field machine 2 is able to be set by the setpoint currents.

These fundamentals u1, u2, u3 of the output voltages with a respective operating point-specific fundamental frequency and a respective operating point-specific fundamental amplitude are modulated by a rectifier 5 of the control device 3. For this purpose, as shown in FIG. 2, the rectifier 5 has a rectifier half-bridge HB1, HB2, HB3 with controllable switches S for each phase U, V, W of the rotating field machine 2. The rectifier 5 is connected to an intermediate circuit ZK in which electrical energy is buffer-stored in intermediate circuit capacitors C1, C2. For this purpose, the intermediate circuit capacitors C1, C2 are charged with a respective DC voltage $+U_{dc}/2$, $-U_{dc}/2$, from which the rectifier 5 generates modulated, pulsed and rectangular output voltages u1', u2', u3' (see also FIG. 3). These output voltages u1', u2', u3' provided at the output of the rectifier 5 result in phase voltages uph1, uph2, uph3 and, due to an inductive filter effect of windings of the phases U, V, W of the rotating field machine 2, in virtually sinusoidal but harmonics-impacted output currents ir1, ir2, ir3.

Figure 3:
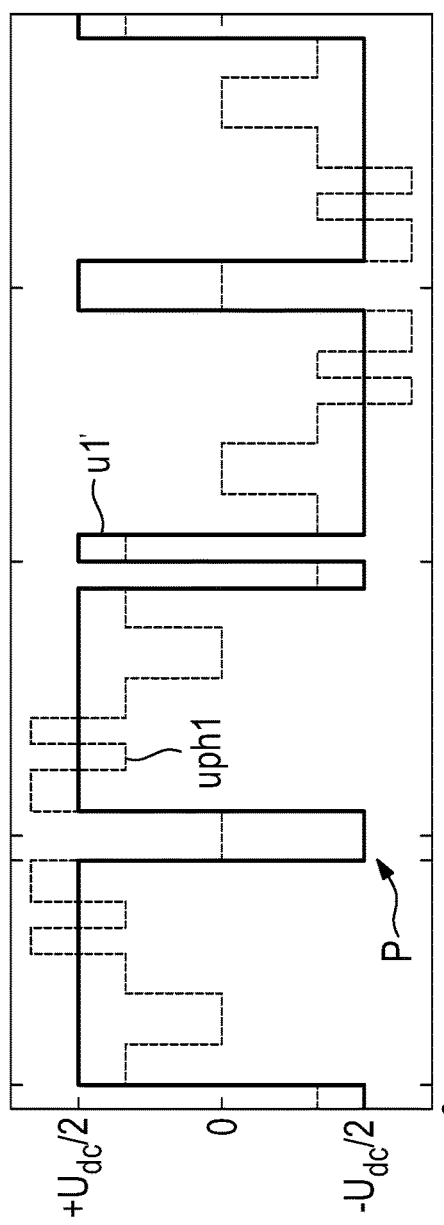
FIG. 3 shows a schematic illustration of profiles of an output voltage of a rectifier and of a phase voltage of a rotating field machine.

In order to provide the modulated output voltages u1', u2', u3' with at the same time minimum harmonics content of the output currents ir1, ir2, ir3, a controller 6 of the control device 3 drives the switches S of the rectifier half-bridges HB1, HB2, HB3 of the rectifier 5 according to a pulse pattern P that is optimized offline for the operating point to be provided (see FIG. 3). The pulse pattern P is in this case optimized with regard to the harmonics content of the output currents ir1, ir2, ir3 of the rectifier 5 for the respective operating point. For this purpose, a conversion table may for example be stored in a storage apparatus 7 of the control device 3, in which conversion table the associated optimum pulse patterns P with minimum distortion are associated with different operating points. The pulse patterns P may for example be determined during test operation of the rotating field machine 2 at the manufacturer and be stored in the storage apparatus 7 for operation of the rotating field machine 2 by the client. This storage apparatus 7 may be read by the controller 6 in order to select the pulse pattern P, optimized offline, corresponding to the respective operating point from the conversion table.

As shown in FIG. 3, such a pulse pattern P is defined by switching angles $\alpha_1$, $\alpha_2$ for the switches S of the rectifier 5. These switching angles $\alpha_1$, $\alpha_2$ result here in the generation of the modulated output voltage u1', which may adopt the values $+U_{dc}/2$ and $-U_{dc}/2$ of the intermediate circuit voltage $U_{dc}$ of the intermediate circuit ZK connected to the rectifier 5. By virtue of a fundamental in the fundamental interval $[0; 2\pi]$, the switching angles $\alpha_1$, $\alpha_2$ are defined here such that the pulse pattern P has quarter-oscillation symmetry. The pulse pattern in the quarter-oscillation interval $[0; \pi/2]$ is thus symmetrical to the pulse pattern P in the quarter oscillation interval $[\pi/2; \pi]$, etc. The pulse pattern P in the half-oscillation interval is also point-symmetrical. The pulse pattern P is thus defined completely by the switching angles $\alpha_1$, $\alpha_2$ in the quarter-oscillation interval $[0; \pi/2]$. FIG. 3 additionally illustrates the phase voltage uph1, resulting from the modulated output voltage u1', on the associated phase U of the rotating field machine 2.

Figure 4:
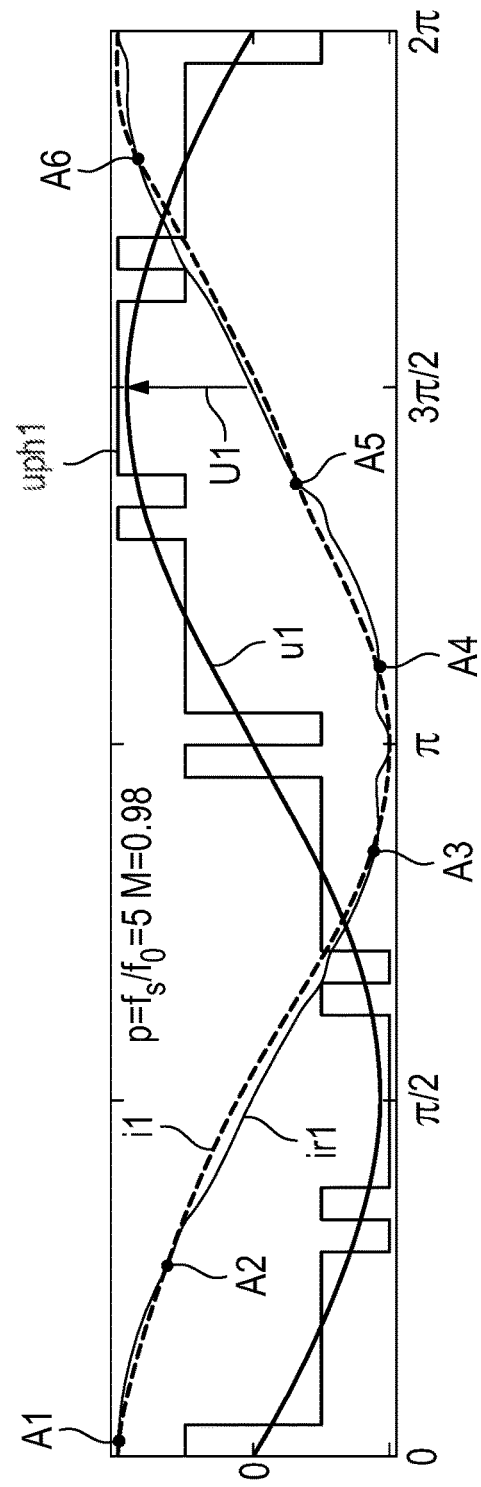
FIG. 4 shows a schematic illustration of various signal profiles.

FIG. 4 shows profiles of the fundamental u1 of the output voltage, of the phase voltage uph1, of the harmonics-impacted output current ir1 and of a fundamental i1 of the output current over a fundamental interval [0; 2π] at a particular operating point p, M. The operating point p, M is defined here by a pulse ratio p and by a degree of modulation M. The pulse ratio p is a ratio between a switching frequency $f_s$ of the switches of the rectifier 5 and a fundamental frequency $f_0$ of the fundamental u1, u2, u3 of the output voltage. The switching frequency $f_s$ of the switches is limited and may for example be at most 10 kHz. The fundamental frequency $f_0$ depends on the rotational speed to be provided and increases with the rotational speed. The pulse ratio p therefore decreases at high rotational speeds. The degree of modulation M is formed by the ratio between fundamental amplitude U1 and physically possible fundamental amplitude.

The output current ir1 resulting from the pulsed modulated output voltage u1' is impacted by harmonics and deviates from a fundamental i1 of the output current. This harmonics-impacted current ir1, and the harmonics-impacted currents ir2, ir3 of the other rectifier half-bridges HB1, HB2, HB3 of the rectifier 5 (see FIG. 1 and FIG. 2) are now sampled by way of a current sensor 8 of the control device 3. The sampled current is fed back to the current controller 4, which then compares the sampled current with the setpoint current and possibly adapts the fundamental u1, u2, u3 of the output voltages. In this case, the current ir1 is sampled at sampling times A1, A2, A3, A4, A5, A6 or sampling angles at which a deviation between the harmonics-impacted current ir1 and the fundamental i1 of the output current is at a minimum, in particular approximately zero. The sampling times A1, A2, A3, A4, A5, A6 are in this case in particular not equidistant, but rather dependent on the pulse pattern P currently being used. These times at which the deviations are at a minimum are predetermined depending on the pulse pattern P and are thus likewise optimized offline.

These pulse pattern-specific sampling times A1, A2, A3, A4, A5, A6 may likewise be stored in the conversion table in the storage apparatus 7 and be read by the controller 6 depending on the pulse pattern P being used at the current operating point p, M.

LIST OF REFERENCE SIGNS

1 Drive unit
2 Rotating field machine
3 Control device
4 Current controller
5 Rectifier
6 Controller
7 Storage apparatus
8 Current sensor
U, V, W Phases
N Neutral point
HB1, HB2, HB3 Rectifier half-bridges
S Switches
ZK Intermediate circuit
C1, C2 Intermediate circuit capacitors
u1, u2, u3 Fundamentals of the output voltage
u1', u2', u3' Modulated output voltages
uph1, uph2, uph3 Phase voltage
$U_{dc}$ Intermediate circuit voltage
U1 Fundamental amplitude
ir1, ir2, ir3 Harmonics-impacted output currents
P Pulse pattern
α1, α2 Switching angles
M Degree of modulation
p Pulse ratio
$f_s$ Switching frequency
$f_0$ Fundamental frequency
A1, A2, A3, A4, A5, A6 Sampling times

What is claimed is:

1. A control device for controlling current of a rotating field machine of a motor vehicle, comprising:
   a current controller that is designed to determine a fundamental of an output voltage for a respective operating point;
   a controller that is designed to modulate the output voltage by driving a rectifier of the control device based on a predetermined pulse pattern that is optimized offline with regard to a minimum current harmonic content for the respective operating point; and
   a current sensor that is designed to sample a harmonics-impacted output current, resulting from the pulse pattern that is used, of the rectifier and to feed said output current back to the current controller, wherein
   sampling times for sampling the harmonics-impacted output current are optimized offline with regard to the pulse pattern that is used and are predetermined as those times at which a deviation between the harmonics-impacted output current and a fundamental of the output current is less than a predetermined threshold value.

2. The control device according to claim 1, wherein
   the predetermined pulse pattern is a pulse pattern that is optimized offline and has quarter-oscillation symmetry, and
   the controller is designed to drive switches of the rectifier based on the pulse pattern that is optimized offline and has the quarter-oscillation symmetry.

3. The control device according to claim 1, wherein
   associations of operating points and pulse patterns that are optimized offline are predetermined and are stored in a storage apparatus, and
   the controller is designed to select that pulse pattern that is optimized offline for driving the switches from the associations that corresponds to the respective operating point.

4. The control device according to claim 1, wherein
   associations of pulse patterns that are optimized offline and sampling times are predetermined and are stored in a storage apparatus, and
   the controller is designed to select those sampling times from the associations and provide them for the current sensor for sampling the output current that correspond to the pulse pattern currently being used.

5. The control device according to claim 4, wherein
   a sampling rate is predefined, and
   the controller is designed to select a number, corresponding to the sampling rate, of sampling times to be used per fundamental interval from the associations that correspond to the pulse pattern currently being used.

6. The control device according to claim 1, wherein
   the operating point is determined by a degree of modulation dependent on a fundamental amplitude of the output voltage and by a pulse ratio of a predetermined switching frequency for switches of the rectifier and a fundamental frequency of the output voltage, and
   the controller is designed to provide the pulse pattern modulation if the degree of modulation is greater than a predetermined degree of modulation threshold value and/or a pulse ratio is less than a predetermined pulse ratio threshold value, and otherwise to provide space vector modulation for the rectifier.

7. A drive unit for a motor vehicle comprising:
a rotating field machine; and
a control device according to claim 1.

8. A motor vehicle comprising a drive unit according to claim 7.

9. A method for controlling current of a rotating field machine of a motor vehicle, in which:
a fundamental of an output voltage is determined for a respective operating point by a current controller,
the output voltage is modulated based on a predetermined pulse pattern by way of a rectifier, which pulse pattern is optimized offline with regard to a minimum current harmonic content at the respective operating point, and
a harmonics-impacted output current, resulting from the pulse pattern that is used, of the rectifier is sampled by a current sensor and fed back to the current controller, wherein
sampling times for sampling the output current are optimized offline with regard to the pulse pattern that is used and provided for current control during operation of the rotating field machine, and are predetermined as those times at which a deviation between the harmonics-impacted output current and a fundamental of the output current is less than a predetermined threshold value.

* * * * *